April 9, 1929.  A. H. JONES  1,708,793
BOLT, SHAFT, AND THE LIKE
Filed Oct. 7, 1927
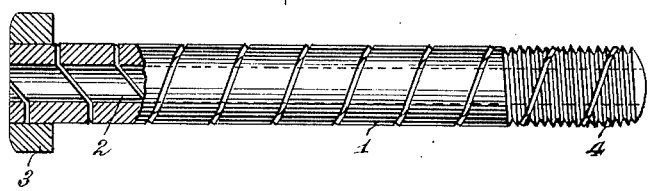
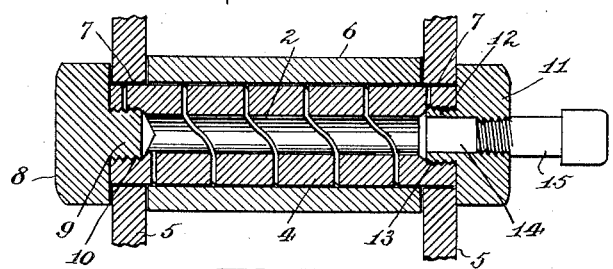
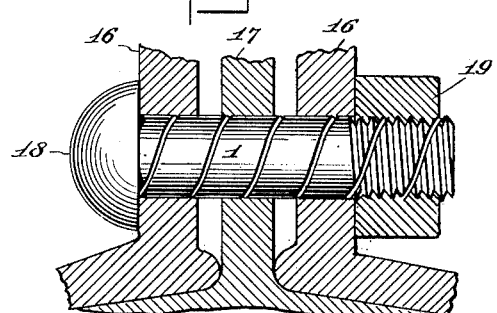
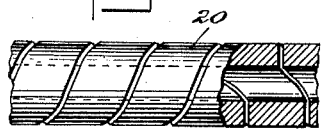
WITNESSES
INVENTOR
Allan H. Jones
BY
ATTORNEY Patented Apr. 9, 1929.

1,708,793

UNITED STATES PATENT OFFICE.

ALLAN H. JONES, OF NEWARK, NEW JERSEY.

BOLT, SHAFT, AND THE LIKE.

Application filed October 7, 1927. Serial No. 224,678.

This invention relates to bolts, shafts and the like, an object of the invention being to provide a bolt or shaft, comprising a helically wound resilient member which is capable of expansion and contraction and which is hollow or tubular in form, providing a chamber for lubricant which is distributed to the bearing of the bolt or shaft through the spaces between the convolutions of the device.

A further object is to provide a bolt of this character, which by reason of its expansion and contraction dispenses with the necessity for lock nuts of any character as the bolt itself exerts a pressure to hold the parts coupled and prevents release of the nut due to stretching of the bolt.

With these and other objects in view, the invention consists in certain novel features of construction and combinations and arrangements of parts which will be more fully hereinafter described and pointed out in the claims.

In the accompanying drawings—

Figure 1 is a view, partly in longitudinal section and partly in elevation, illustrating one form of my improved bolt;

Figure 2 is a view in section showing another form of my improved bolt as a journal or coupling bolt, such as employed as a shackle or for any other analogous use, and which is especially adapted for use in connecting the movable parts of an automobile and the like;

Figure 3 is a view showing my improved bolt as applied to a railroad rail;

Figure 4 is a view, partly in elevation and partly in section, showing my invention as applied to a shaft.

In Figure 1 I illustrate a bolt which may be used for any purpose for which a bolt is ordinarily used. This bolt includes a body or shank 1 composed of a helically wound strip of spring metal, preferably steel, which is hardened and which has resiliency, and the convolutions are as close together or as far apart as desired.

This bolt has a longitudinal bore 2 and a head 3 is fixed on the bolt in any approved manner. One end of the bolt is screw-threaded, as shown at 4, for the reception of an ordinary nut.

In Figure 2 I illustrate my improved bolt, which is helically wound as above explained, and is employed to couple two side plates or members 5, 5 with a bearing sleeve 6, such as commonly employed in connection with a shackle.

The bolt 4 is of an external diameter to fit the sleeve 6 and also to fit in openings 7 in the plates 5, 5, and is closed at one end by a head 8 having a screw-threaded stud 9 thereon engaging a threaded socket 10 at one end of the bolt.

The other end of the bolt is closed by a head 11 having a screw-threaded nipple 12 screwed into a threaded socket 13 in the opposite end of the bolt. This head 11 has a bore 14 communicating with the bore 2 of the bolt, and the outer end of the bore 14 is screw-threaded for the reception of the threaded end of a grease cup 15. The grease or other lubricant is forced into the bore of bolt 4 and passes through the convolutions of the bolt into the bearing to maintain the latter fully lubricated.

In Figure 3 I illustrate my improved bolt 1 securing fishplates 16 to opposite sides of a rail 17. In this form of bolt I have shown a rounded head 18 and a nut 19 thereon.

Figure 4 illustrates my invention as applied to a shaft, to which I have given reference numeral 20, which consists of a helically wound tubular member.

I therefore desire to cover broadly the idea of a bolt or shaft composed of a helically wound strip, the device being resilient so as to contract and expand, or capable of contraction and expansion.

Various changes and alterations might be made in the general form of the parts described without departing from my invention and hence I do not limit myself to the precise details set forth but consider myself at liberty to make such changes and alterations as fairly fall within the spirit and scope of the appended claims.

I claim:

1. A bolt, shaft or the like, comprising a helically wound resilient member having a nut-receiving screw-threaded end, the convolutions of said member constituting lubricant passages which communicate with the longitudinal bore of said member.

2. A device of the character described, comprising a helically wound resilient member, bolt holding devices removably coupled to the ends of the member, one of said devices comprising a lubricant passage, and means for admitting lubricant to said passage and to the interior of the bolt.

3. The combination with a pair of spaced plates, of a bearing sleeve between the plates, a helically wound journal bolt in the bearing and projecting through the plates, removable heads on the ends of the bolt, one of said heads having a lubricant passage therein communicating with the bore of the bolt, and a grease cup having screw threaded engagement with said passage.

Signed at New York in the county of New York and State of New York this 5th day of October A. D. 1927.

ALLAN H. JONES.